Feb. 24, 1970

M. C. GIBELLINA 3,496,957

PRESSURE COOKER STEAM RELEASE SYSTEM

Filed Nov. 20, 1967

INVENTOR.
MICHAEL C. GIBELLINA
BY
Drummond & Cahill
ATTORNEYS

United States Patent Office 3,496,957
Patented Feb. 24, 1970

3,496,957
PRESSURE COOKER STEAM RELEASE SYSTEM
Michael C. Gibellina, 8350 E. Cheery Lynn,
Scottsdale, Ariz. 85251
Filed Nov. 20, 1967, Ser. No. 684,441
Int. Cl. F16t 1/34; F15d 1/00; B65d 51/16
U.S. Cl. 137—171
5 Claims

ABSTRACT OF THE DISCLOSURE

A pressure cooker incorporating a steam release enclosure communicating with a pressurizable vessel. The enclosure includes a buffer chamber communicating along the bottom portion thereof through a condensate chamber to a baffle chamber; steam from the pressurizable vessel passes through the buffer chamber, the condensate chamber to the baffle chamber to be released to the atmosphere.

---

The present invention pertains to pressure cookers and, more particularly, to systems for releasing pressure from pressure cookers during the utilization thereof.

The generation of steam in pressure cookers is normally relieved through a simple opening in a removable lid thereof. The maintenance of sufficient pressure for proper cooking becomes considerably more important in commercial-type pressure cookers wherein the pressurized vessels are relatively large in volume. As a concomitant to the generation of steam, grease is frequently carried out in the steam stream, adding to the other undersirable features of commercial pressure cooking. The usual noise generated by the escaping steam and the moisture content of the steam further adds to the difficulties of handling commercial pressure systems and greatly complicates maintaining the vicinity of the pressure cooker in a clean and sanitary state.

It is therefore an object of the present invention to provide a pressure cooker steam release system that removes substantial amounts of water carried with escaping steam from a pressure cooker.

It is also an object of the present invention to provide a pressure cooker steam release system that condenses steam escaping from a pressurized vessel and traps grease and other materials being carried by the steam.

It is still another object of the present invention to provide a pressure cooker steam release system that rapidly, silently, and effectively vents steam escaping from a pressurized vessel, free of excess water and droplets of grease.

These and other objects of the present invention will become apparent to those skilled in the art as the description thereof proceeds.

Briefly, in accordance with the embodiment chosen for illustration, the present invention contemplates the utilization of a steam release enclosure communicating with the interior of a pressurizable vessel. A conventional pressure control valve as well as a pressure release valve may be connected between the vessel and the steam release enclosure. A buffer chamber receives the steam from the vessel and accommodates variations in steam pressure as well as providing a means for capturing entrapped grease particles and large water droplets. The materials thus captured are collected in a condensate chamber and the steam then passes to a baffle chamber. The steam travels over a plurality of baffle blades in the baffle chamber, whereupon a proportion of the steam condenses and droplets of water being carried by the steam collect. The moisture thus collected flows from the downwardly inclined baffle blades to the condensate chamber. The steam escaping from the baffle chamber is relatively "dry," and is at a low velocity, thus silently venting to the atmosphere.

The present invention may more readily be described by reference to the accompanying drawings, in which.

Figure 1:
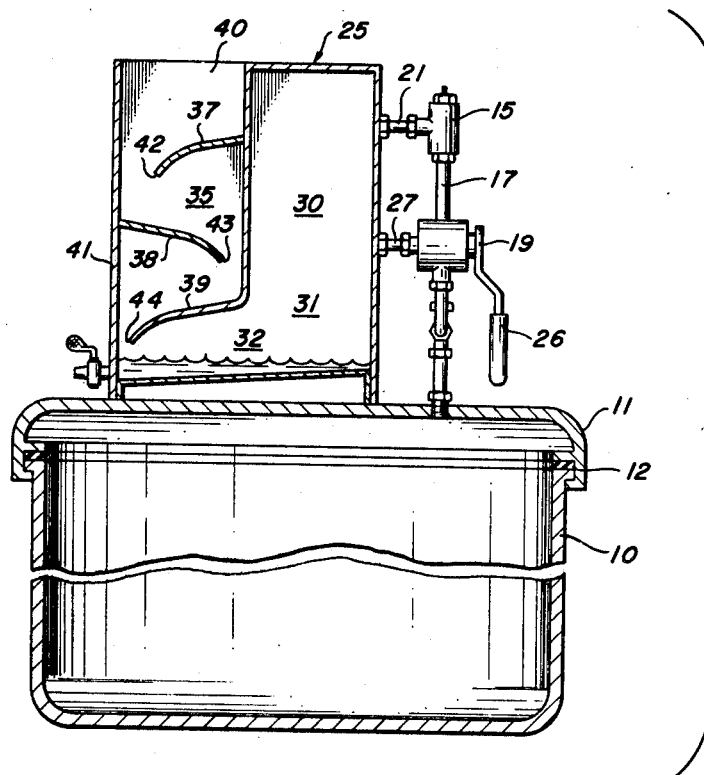
FIGURE 1 is a side elevational view, partly in section, of a pressure cooker steam release system constructed in accordance with the teachings of the present invention.
Figure 2:
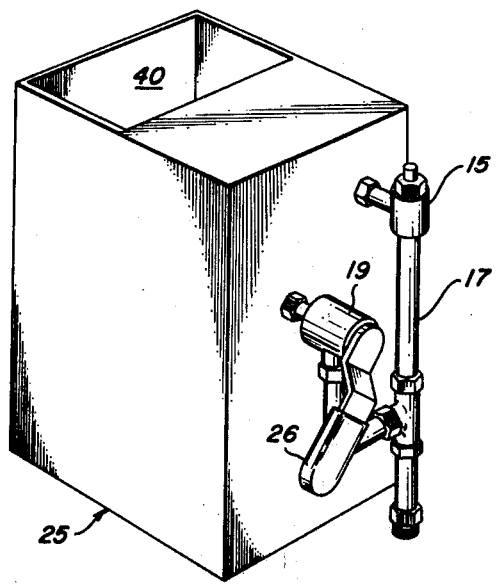
FIGURE 2 is a perspective view of a portion of the system of FIGURE 1.

Referring now to the drawings, a pressurizable vessel 10 is shown having a removable lid 11 secured thereto by any convenient means and characteristically having a rubber or resilient gasket 12 therebetween. A pressure control valve 15 communicates to the interior of the vessel 10 through conduits 17. A pressure release valve 19 is connected in parallel with the valve 15. The pressure control valve may be of any conventional type wherein the valve remains closed until a predetermined pressure is reached, whereupon the valve partially opens to limit the pressure. The pressure control valve 15 vents through an outlet 21 into a steam release enclosure 25. The steam release valve 19 is placed in parallel with the pressure control valve 15 and permits the operator to relatively quickly relieve the pressure within the vessel 10 by operating the handle 26, thus opening the valve and venting the pressure within the vessel 10 into the enclosure 25 through conduit 27.

The steam release enclosure 25 includes a buffer chamber 30 having an open bottom 31 communicating with a condensate chamber 32. A baffle chamber 35 positioned adjacent the chamber 30 and separated therefrom by the wall 36 includes a plurality of baffle blades 37, 38, and 39. The open bottom of the baffle chamber 35 communicates with the buffer chamber 30 along the bottom thereof through the condensate chamber 32. The top 40 of the baffle chamber 35 is open to the atmosphere.

The baffles 37, 38, and 39 are vertically spaced from each other and alternately extend from the wall 36 and the opposite wall 41. The baffle blades are inclined downwardly and terminate in a gentle curve at the tips thereof. Each of the baffle blades 37, 38 and 39 terminate short of the opposite wall a distance greater than the similar distance of the next lower baffle blade. For example, the tip 42 of the baffle blade 37 extends further from the wall 41 than the tip 43 of the baffle blade 38 extends from the wall 36. Similarly, the tip 43 of the baffle blade 38 extends further from the wall 36 than the tip 44 of the baffle blade 39 extends from the wall 41. It may be seen that spaces of increasing volume are formed between successive blades; that is, the volume of the space bounded by baffles 38 and 39 is less than the volume of the space bounded by baffles 37 and 38.

In the embodiment chosen for illustration, the steam release enclosure 25 is shown mounted integrally with the removable lid 11 of the enclosure 10. It will be obvious to those skilled in the art that the enclosure may be mounted remote from the vessel 10 and be connected thereto such as by a flexible conduit. Also in the embodiment chosen for illustration, the steam release enclosure 25 is shown having a false bottom inclined so as to provide a means for draining condensate collected in the condensate chamber.

In operation, the steam, including coherent drops of water, grease, etc., flows through the valve 15 into the buffer chamber 30. Variations or pulsations in the pressure are buffered in the chamber 30 and the larger water droplets as well as heavier grease droplets fall from the main steam stream and are collected in the condensate chamber 32. The steam escapes over the collected condensate through the relatively narrow passage formed between the tip 44 of the baffle blade 39 and the wall 41 and thence through the passageway formed by the tip 43 and the wall 36, and finally the passageway formed by the tip 42 and the wall 41 to the atmosphere. The successive passages of the baffles results in the condensation of a substantial portion of the moisture content of the steam as well as the reduction in velocity of the steam as it escapes to the atmosphere. Condensate on the baffle blades drains therefrom into the condensate chamber. When the cooling operation is finished, the operator opens valve 19 to vent the vessel 10 into the chamber 30. The rapid reduction in vessel pressure would normally be accompanied by a great deal of entrapped water and grease, but the steam release enclosure 25 provides a means for "cleaning" the escaping vapors as well as rendering the operation silent.

It will be apparent to those skilled in the art that the system of the present invention provides a means for eliminating the noise, excess moisture and entrapped grease content of steam escaping from a pressure cooker. It will also be apparent to those skilled in the art that many modifications may be made in the system of the present invention without departing from the spirit and scope thereof. It is therefore intended that the present invention be limited only by the claims appended hereto.

I claim:

1. A pressure cooker steam release system comprising: a pressurizable vessel having a removable lid; a pressure controlling valve having an inlet communicating with said vessel and having an outlet; a steam release enclosure including a buffer chamber having an open bottom, a condensate chamber, and a baffle chamber having parallel sides and an open bottom and top; said buffer chamber connected to said outlet and communicating along the open bottom thereof with the open bottom of said baffle chamber through said condensate chamber; said baffle chamber including a plurality of vertically spaced baffle blades extending from alternate opposite walls of said baffle chamber forming spaces therebetween having increasing volume from bottom to top, each of said baffle blades being inclined downwardly from horizontal; each of said baffle blades terminating short of the opposite wall of said baffle chamber a distance greater than the similar distance of the next lower baffle blade.

2. The combination set forth in claim 1 wherein said steam release enclosure is mounted on and secured to said removable lid.

3. The combination set forth in claim 1 wherein said baffle blades curve downwardly from the point of attachment to the wall of the baffle chamber to the tips thereof.

4. The combination set forth in claim 1 including a steam release valve connected in parallel between said vessel and said enclosure for providing a by-pass passage from said vessel to said enclosure.

5. The combination set forth in claim 3 including a steam release valve connected in parallel between said vessel and said enclosure for providing a by-pass passage from said vessel to said enclosure.

References Cited

UNITED STATES PATENTS

| 725,413 | 4/1903 | Cottle | 55—444 |
| 2,720,214 | 10/1955 | Rupp | 137—599 X |
| 3,086,677 | 4/1963 | Konchan | 220—44 |

ALAN COHAN, Primary Examiner

U.S. Cl. X.R.

138—42; 220—44